July 25, 1967 R. C. MANDELL ET AL 3,333,198
TELEVISION CONVERTER FOR CATV SYSTEM
Filed Dec. 29, 1965
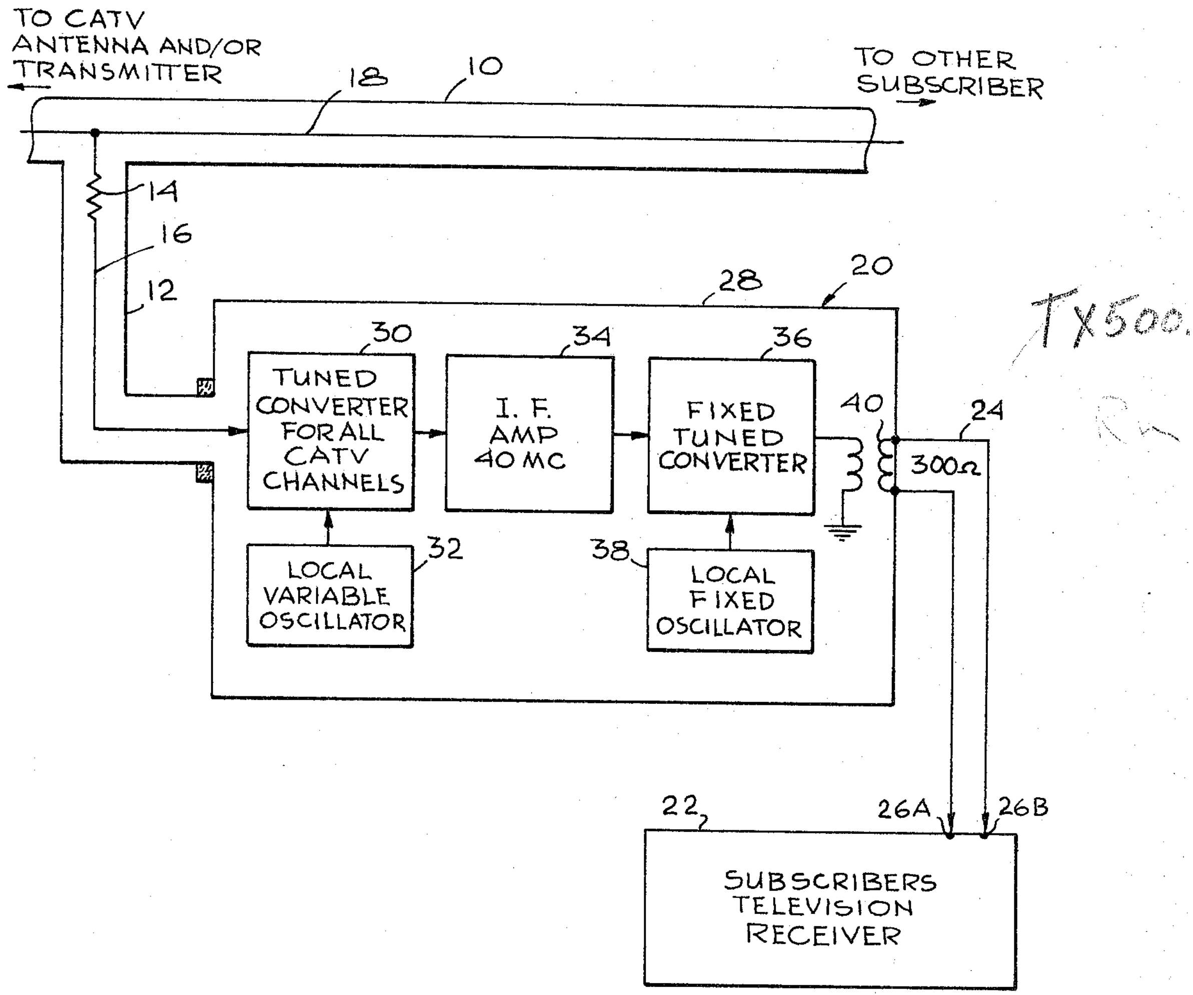
TX500
INVENTORS
RONALD C. MANDELL
GEORGE BROWNSTEIN
BY Samuel Lindenberg
ATTORNEY

United States Patent Office 3,333,198
Patented July 25, 1967

3,333,198

TELEVISION CONVERTER FOR CATV SYSTEM

Ronald C. Mandell, Los Angeles, and George Brownstein, Granada Hills, Calif., assignors, by mesne assignments, to Ampli-Vision Corporation, Los Angeles, Calif., a corporation of California Filed Dec. 29, 1965, Ser. No. 517,300
1 Claim. (Cl. 325—308)

ABSTRACT OF THE DISCLOSURE

An arangement for a CATV system is provided whereby those CATV systems which distribute television signals by coaxial cable to subscribers on the same channel frequencies as local television transmitters can prevent interference from local television transmitters with signals being received over the CATV. The CATV signal which is on the same channel as the local transmitter is applied to a converter which converts this signal to a locally unused channel. The television receiver is tuned to this unused channel, whereby the signal coming over the CATV cable is displayed without any interference.

This invention relates to community antenna television systems, and more particularly to improvements therein.

A community antenna television system is one wherein the television receivers in the homes of a group of people in a community, who are usually called "subscribers," are connected to a coaxial cable which is connected through amplifiers to a single antenna. The antenna receives signals from television stations which the subscribers' receivers either cannot receive or cannot receive too well. These signals are then transmitted on the CATV system on channels which the local television transmitters are not using. The subscriber can then reeive signals over the community antenna television system and, if he so desires, by means of a switch, can connect his receiver to his own antenna for receiving local broadcasts.

In those communities where CATV systems are approved, it is invariably a legal requirement that the CATV system also carry and distribute the locally originated television channels. However, it was found that when the CATV owner sends a program over his cable to subscribers, on the same frequency as one of the locally transmitted channels, if the signals of the local transmission are strong, as very often happens, they reach the subscriber's television set through a path that is different than the one provided to the CATV antenna. The resulting differences in transmission time cause ghosts to appear on television screens if the same program is being provided over both paths, or interference patterns occur if different programs are being provided on both paths. This occurs despite the fact that the television receiver is connected to the CATV coaxial cable system. The leakage into the television set directly through the air is strong enough to spoil the program being reproduced by the television receiver. In order to avoid this problem, the CATV owners usually convert the locally transmitted channels to another channel, not originated locally. However, this has the effect of using two channel positions for every locally originated channel being carried.

In cities such as New York city, where the locally transmitted signals are strong and there is also a multipath problem, reception is poor even on CATV, to which resort is had to improve the reception.

An object of this invention is the provision of an arrangement for a CATV system which eliminates the effects of multipath transmission to a subscriber's receiver.

Yet another object of the present invention is the provision of an attachment for a receiver which enables the use of the same channels as those being locally broadcast without any adverse effects.

Still another object of the present invention is the provision of an attachment for a television receiver of a subscriber to a CATV system, whereby the number of channels made available for the CATV service is increased.

These and other objects of this invention are achieved in an arrangement wherein there is provided an attachment which connects between the distributing coaxial cable of the CATV system and the antenna terminals of the television receiver of the subscriber. This attachment comprises a shielded enclosure which has circuits therein connected to the distributing coaxial cable by a well shielded drop cable. Within the shielded enclosure is a tunable converter for covering the television channels being used by the CATV system. The subscriber to the system tunes this converter to the various television channels in the same manner as he would tune the tuner on his television set.

The output of the converter goes through a buffer intermediate frequency amplifier which is tuned to a video carrier at an intermediate frequency, such as 40 megacycles. The output of this intermediate frequency amplifier goes to a fixed tuned converter which converts the intermediate frequency to the frequency of one of the locally unused VHF television channels. That is, this television channel is one which the local television stations are not using. With the arrangement described, there is no interference from any of the locally based television transmitters since the receiver is not tuned to any one of these and because of the shielding of the attachment, the signals coming through the air cannot get into the tuner.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a block schematic diagram of an embodiment of the invention.

The drawing shows a block schematic diagram of an attachment used in a CATV system, in accordance with this invention, at a subscriber's receiver. The signals from the transmitter are distributed by a coaxial cable 10 to the subscribers for the CATV. At each subscriber location there is a drop cable 12, which comprises a very well shielded coaxial cable, just as the distributing cable is a very well shielded coaxial cable. Usually, an isolating impedance 14 is connected between the inner conductor 16 of the drop cable and the inner conductor 18 of the distributing cable.

The drop cable 12 connects to an attachment 20 for the subscriber television receiver 22. The attachment is connected by an impedance matching wire pair 24 to the antenna terminals 26A, 26B of the subscriber television receiver 22. The container 28, for the converter 20, comprises heavy shielding walls which completely isolate the circuits contained therein from any external electric and electromagnetic fields. The inner conductor 16 of the drop cable is connected to a tuned converter 30 for all television channels being used by the CATV system. A local variable oscillator 32 provides the required heterodyning signals for converting the modulated carriers applied to the converter by the drop cable to a suitable intermediate frequency. Such suitable intermediate frequency may be a frequency on the order of 40 megacycles. The output of the tuned converter is applied to an intermediate frequency amplifier 34 which is tuned to 40 megacycle signals. The output of the intermediate frequency amplifier, which serves as a buffer, is applied to a fixed tuned converter 36 which also receives the output of a local fixed oscillator 38. The fixed tuned converter converts the intermediate frequency to one of the VHF television channels. The channel which is selected should be one which is not being used by any local transmitters so that when the television set is tuned to this channel, there will be no interfering radiation. The output of the fixed tuned converter is coupled by means of the transformer 40 and the wires 24 to the television antenna terminals 26A, 26B of the subscriber's television receiver.

For the subscriber to use the arrangement shown, all he need do is turn the tuner of his television receiver to the channel to which the output of the fixed tuned converter 36 is tuned. He can then adjust the tuned converter 30 in the manner that he normally uses the tuner in his receiver, for tuning to any one of the channels which is being distributed by the CATV system.

There has accordingly been described and shown herein a new and useful system whereby the number of channels available to a CATV system is increased and can include channels which are being used by the local broadcasting stations, without any deleterious effects being noted on the program being reproduced by the subscriber television receiver.

What is claimed is:

In a community antenna television system of the type wherein television programs are distributed to subscriber television receivers over a coaxial cable, the method of enabling a subscriber television receiver to receive over said coaxial cable a program using the same television channel as is used by a local transmitter, without interference by said local transmitter, said method comprising tuning said television receiver to a channel not used by said local transmitter, converting television signals received over said coaxial cable having its frequency of a locally transmitted television channel to signals having an intermediate frequency, converting said signals having an intermediate frequency to signals having the frequency to which said television receiver is tuned, preventing radiation from said local transmitter from interfering with said signals received over said coaxial cable, said signals having an intermediate frequency and with said signals having the frequency to which said television receiver is tuned, and applying said signals having the frequency to which said television receiver is tuned to said television receiver.

References Cited

UNITED STATES PATENTS

| | | | |
|---|---|---|---|
| 2,245,385 | 6/1941 | Carlson | 325—460 X |
| 2,628,275 | 2/1953 | Parker | 178—6 |
| 2,922,881 | 1/1960 | Frey | 325—461 X |
| 3,054,858 | 9/1962 | Reid | 325—308 X |

OTHER REFERENCES

Buchsbaum: Radio and Television News, April 1952, pp. 48, 49, 86, 87.

JOHN W. CALDWELL, *Acting Primary Examiner.*

REEXAMINATION CERTIFICATE (910th)

United States Patent [19]

[11] B1 3,333,198

Mandell et al.

[45] Certificate Issued Aug. 23, 1988

[54] TELEVISION CONVERTER FOR CATV SYSTEM

[75] Inventors: Ronald C. Mandell, Los Angeles; George Brownstein, Granada Hills, both of Calif.

[73] Assignee: International Telemeter Corp., Los Angeles, Calif.

Reexamination Request:
No. 90/001,281, Jul. 6, 1987

Reexamination Certificate for:

| | |
|---|---|
| Patent No.: | **3,333,198** |
| Issued: | **Jul. 25, 1967** |
| Appl. No.: | **517,300** |
| Filed: | **Dec. 29, 1965** |

[51] Int. Cl.[4] .......................... H04H 1/02; H04B 1/10
[52] U.S. Cl. .......................................... 455/6; 455/65
[58] Field of Search .......................... 455/6; 358/905

[56] References Cited

U.S. PATENT DOCUMENTS

| | | | |
|---|---|---|---|
| 2,773,177 | 12/1956 | Witte | 250/16 |
| 3,081,376 | 3/1963 | Loughlin | 178/5.1 |
| 3,104,280 | 9/1963 | Akrell | 178/5.1 |
| 3,184,537 | 5/1965 | Court et al. | 178/5.1 |

OTHER PUBLICATIONS

Channel Commander Reference, Jerrold Instruction Manual, copies dated 1965, 1963.

J. Beever, "Servicing TV Distribution Systems," *Radio Electronics*, Dec. 1960, pp. 51-53.

FCC Rules and Regulations, Part 15, 1961.

International Telemeter Brochure, "Memo to Motion Picture Exhibitors from Telemeter," circa 1960.

P. Court, "Telemeter Pay Television System," *Journal of the SMPTE*, vol. 71, Mar. 1962, pp. 161-166.

R. Ficchi, "Electrical Interference," Hayden Book, Copyright 1964, LCCN 63-22511 (see summary sheet for pertinent pages).

Frederick Research Corporation, "Handbook on Radio Frequency Interference," vol. 3, Copyright 1962 (see summary sheet for pertinent pages).

S. Tenen, "The 14-83," *Popular Electronics*, Oct. 1962, pp. 42-46 and 99.

P. Court, "How a Closed-Circuit Pay TV System Works," *Electronics*, Aug. 19, 1960, pp. 49-55.

*Primary Examiner*—Michael A. Masinick

[57] ABSTRACT

An arrangement for a CATV system is provided whereby those CATV systems which distribute television signals by coaxial cable to subscribers on the same channel frequencies as local television transmitters can prevent interference from local television transmitters with signals being received over the CATV. The CATV signal which is on the same channel as the local transmitter is applied to a converter which converts this signal to a locally unused channel. The television receiver is tuned to this unused channel, whereby the signal coming over the CATV cable is displayed without any interference.

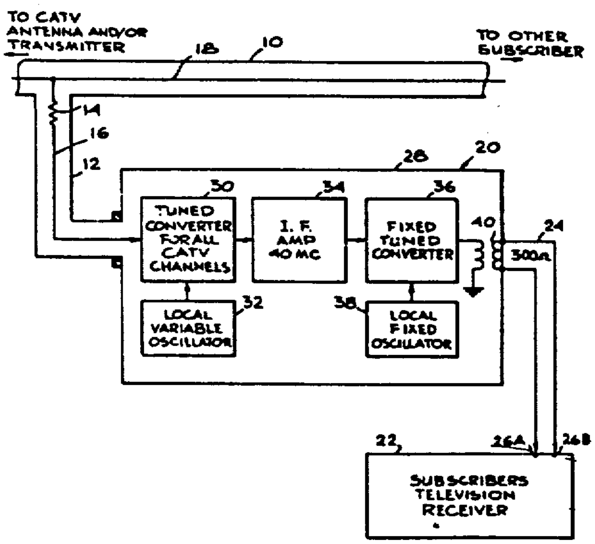

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *